United States Patent [19]

Sander et al.

[11] Patent Number: 4,811,131
[45] Date of Patent: Mar. 7, 1989

[54] METHOD AND APPARATUS FOR SCANNING AND RECOVERING INFORMATION FROM A RECORD MEDIUM

[75] Inventors: Willy M. Sander, Stamford; Raymond F. Freer, Fairfield, both of Conn.

[73] Assignee: Dictaphone Corporation, Stratford, Conn.

[21] Appl. No.: 97,904

[22] Filed: Sep. 17, 1987

[51] Int. Cl.[4] .................. G11B 15/48; G11B 19/10
[52] U.S. Cl. .................. 360/74.4; 360/72.1; 360/73.11
[58] Field of Search .......... 360/74.4, 72.1, 72.2, 360/69, 71, 27

[56] References Cited

U.S. PATENT DOCUMENTS

| | | | |
|---|---|---|---|
| 4,290,090 | 9/1981 | Yamamoto | 360/72.1 |
| 4,384,308 | 5/1983 | Yanagida | 360/8 |
| 4,435,735 | 3/1984 | Furuta | 360/74.4 |
| 4,442,464 | 4/1984 | Ito | 360/74.4 |
| 4,542,427 | 9/1983 | Nagai | 360/72.1 |
| 4,570,190 | 2/1986 | Kitoh | 360/73 |
| 4,580,179 | 4/1986 | Sakaguchi et al. | 360/69 |

OTHER PUBLICATIONS

Racal Recorders I.C.R. 64 Voice Communications Recorder.

Primary Examiner—John H. Wolff
Attorney, Agent, or Firm—Robert H. Whisker; Melvin J. Scolnick; David E. Pitchenik

[57] ABSTRACT

An apparatus and method for scanning a moveable record medium, detecting the presence of signal information on the moveable record medium and halting the moveable record medium at the detected signal information or automatically rerecording the detected signal information. The method and apparatus is particularly adapted to function in a multichannel logging system, wherein the desired signal information is intermixed with low frequency time and information signals. The method and apparatus is capable of filtering out the low frequency signals while the tape moves at speeds between playing speed and up to 100 times playing speed, detecting if any signal information remains, and either halting the tape at the detected signal information or automatically rerecording it.

19 Claims, 8 Drawing Sheets

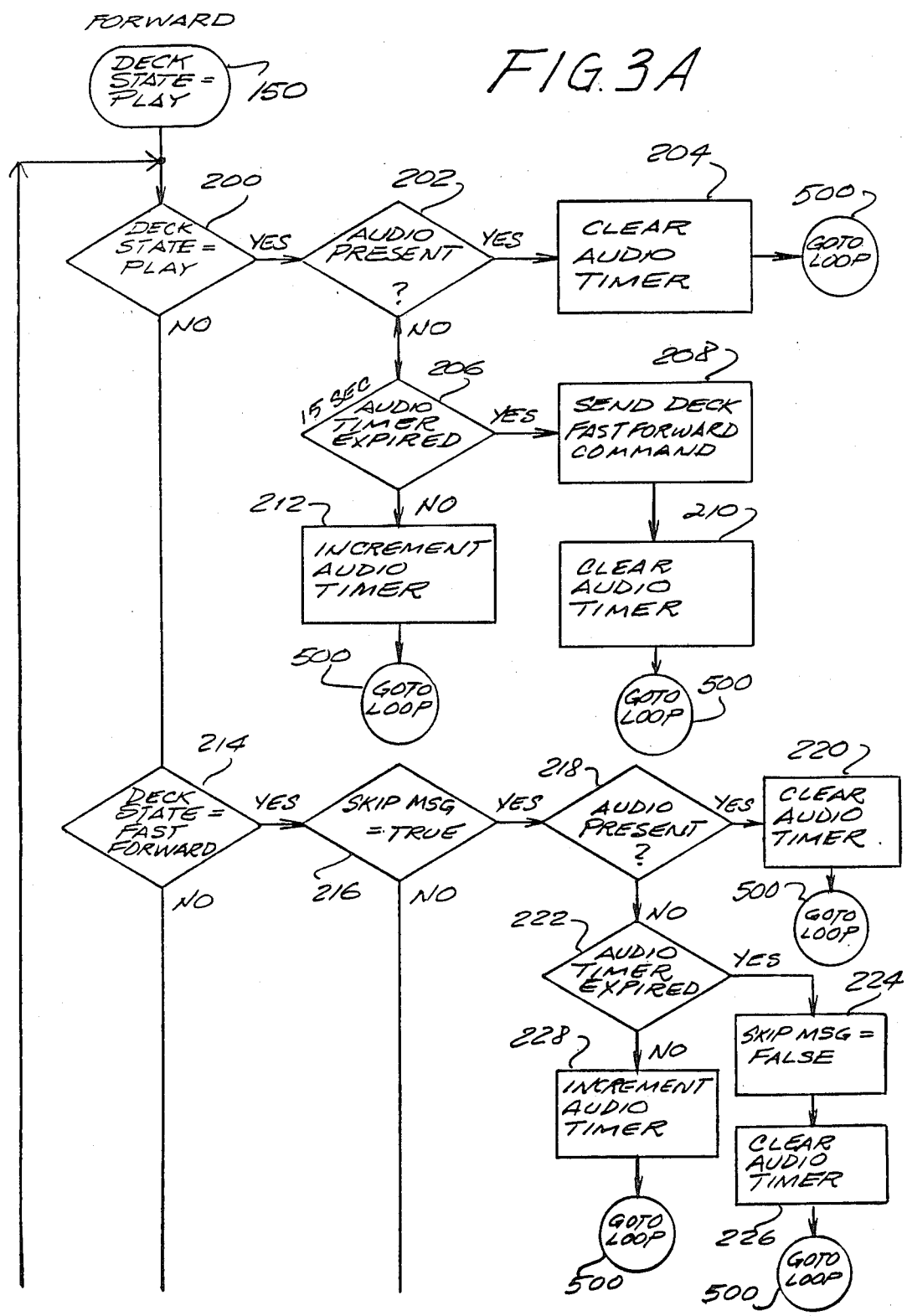

TO FIG. 4B

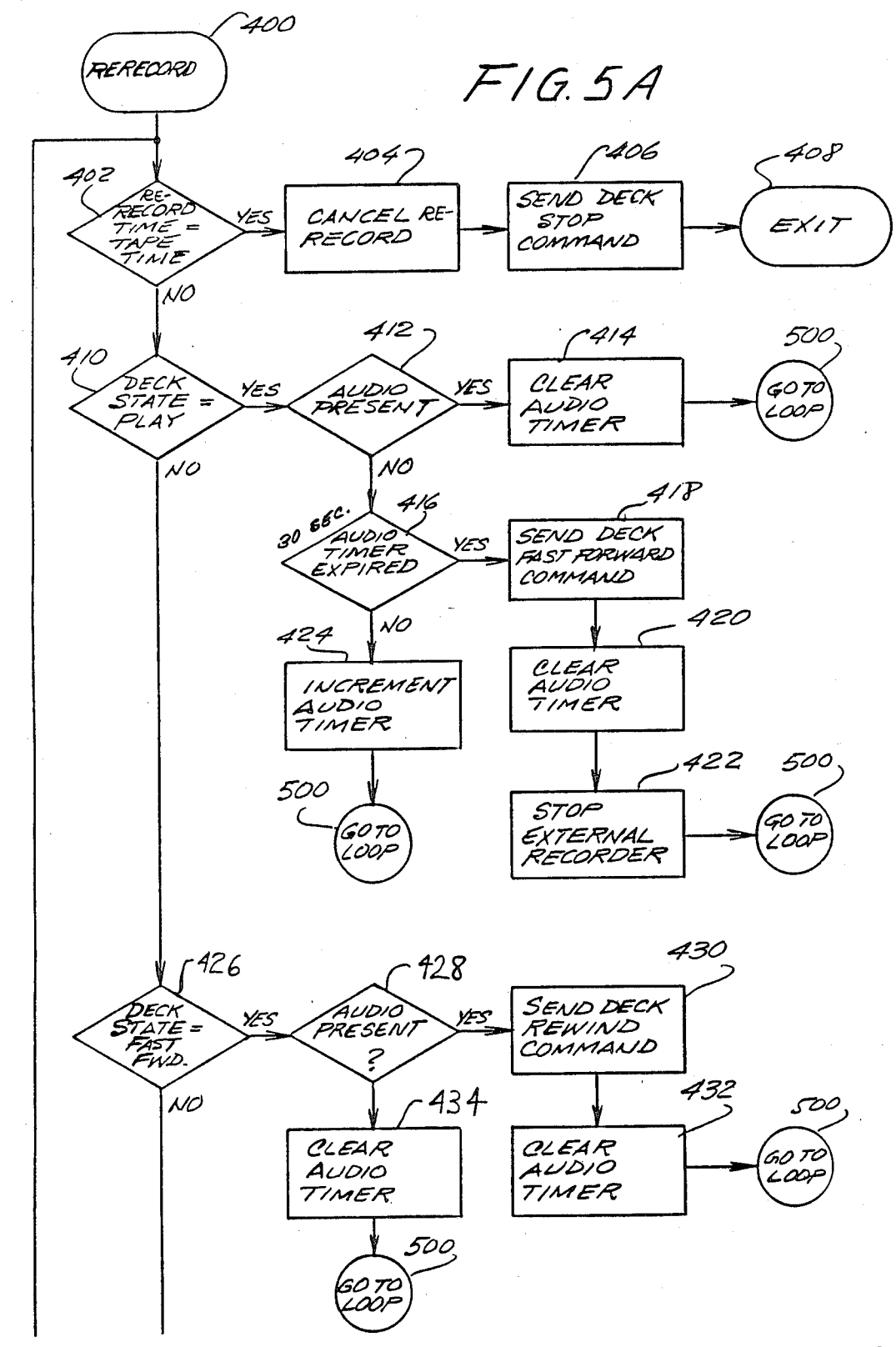

METHOD AND APPARATUS FOR SCANNING AND RECOVERING INFORMATION FROM A RECORD MEDIUM

BACKGROUND OF THE INVENTION

This invention relates to a method and apparatus for scanning a movable record medium in a signal recording/playback device and playing and/or rerecording any signal information detected on the movable record medium. More particularly, this invention relates to a method and apparatus for scanning an audio tape in a logging system for audio content and replaying and/or rerecording any audio messages detected during the scan.

Scanning an audio tape either to avoid listening to long periods of silence or simply to move to another audio selection is a familiar process to one having ordinary skill in the audio recording art. For example, a common feature on stereo cassette tape players enables the user to move to the next selection on the cassette by pushing a forward or reverse "music scan" button. When such a button is depressed, the tape automatically advances to the end of the next blank section of the tape which separates selections.

In a multichannel logging system, this simple "scan past silence" technique does not function satisfactorily. A typical multichannel logging system is adapted to record any and all telephone communications which a large office, or, more commonly, a police or fire department, might receive during the course of a day or even longer period. Such logging systems almost invariably record the time such calls were received, using various methods to encode the time on a low frequency carrier signal for recording on the record medium (e.g. magnetic tape). Also, such logging systems frequently place a "guard" tone on all channels. This is done to verify that each channel is functioning properly. This "guard" tone is also generally a low frequency signal. If a "scan past silence" technique were used to scan for messages on a tape containing such time and "guard" signals, these signals would be detected causing the tape to stop when no message is actually present. Although the installation of a high pass filter with a low frequency cutoff above the "guard" and time code signal might suggest itself as a possible solution to the false triggering problem, such a filter would not correct the problem. When a tape is scanned for audio, it moves at some varying multiple of its normal playing speed. In a logging system, this speed may vary, for example, from 50 times to 100 times the normal playing speed of the tape as the tape is scanned. At these high speeds the various carrier signals shift upwards in frequency. For example, the time code signal may be shifted in frequency from 80 Hz to up to 8 KHz. A filter with a fixed cut off frequency would not be capable of removing both the time code and "guard" signals.

OBJECTS OF THE INVENTION

Therefore, it is an object of the present invention to provide a method and apparatus for use in a recording/playback device which will scan a movable record medium, remove low frequency carrier and noise signals, and indicate when signal information is encountered.

Another object of this invention is to perform the aforementioned scanning function correctly as the movable record medium varies in speed from playing speed to, for example, one hundred times playing speed.

A further object of this invention is to scan several channels on a record medium for signal information at the same time.

A further object of this invention is to perform the aforementioned scanning function in both forward and reverse directions.

Another object of this invention is to rerecord automatically signal information found on a channel being scanned.

A further object of this invention is to skip from one section of signal information on a record medium to the next, even when beginning the scan in the middle of a section of signal information.

A still further object of this invention is to limit the aforementioned scanning function to a certain time period.

A still further object of this invention is to control a forward tape scan so that when signal information is detected, the tape halts and then rewinds a sufficient amount to account for the overshoot of the start of the signal information that occurs during the forward scan.

A still further object of this invention is to control a reverse tape scan so that reverse movement continues after signal information is detected until signal information is absent, at which time the tape is stopped and played in the forward direction.

A still further object of this invention is to control forward and reverse tape scans so that signal information may be passed over withoiut terminating the scanning operation.

Various other objects, advantages and features of the present invention will become readily apparent from the ensuing detailed description and the novel features will be particularly pointed out in the appended claims.

SUMMARY OF THE INVENTION

In accordance with this invention, a method and apparatus are provided for scanning a movable record medium used in a signal recording/playback device, filtering out low frequency signals and noise, and detecting the presence of any signal information that remains. Preferably, the record medium is scanned in a fast forward or fast reverse mode and halted when signal information is located. In accordance with one aspect of this invention, filtering is achieved by a high pass filter having a low frequency cut-off which is automatically adjusted as a function of the speed of the movable record medium. The low frequency cut-off is moved higher as the tape moves faster. Thus a frequency shift in played back signal information, which occurs when the tape is moving faster, is compensated.

In accordance with a still further aspect, the present invention is used with a multichannel automatic radio or telephone/information logging system. The adjustable filter removes time code and "guard" signals from the record medium to detect when audio (or other) information has been located. Such information may be automatically rerecorded in a given channel on an additional recording/playback device.

BRIEF DESCRIPTION OF THE DRAWINGS

The following detailed description, given by way of example, and not intended to limit the present invention solely to the embodiments shown and described herein, will best be understood in conjunction with the accompanying drawings in which.

DETAILED DESCRIPTION OF A CERTAIN PREFERRED EMBODIMENT

Figure 1:
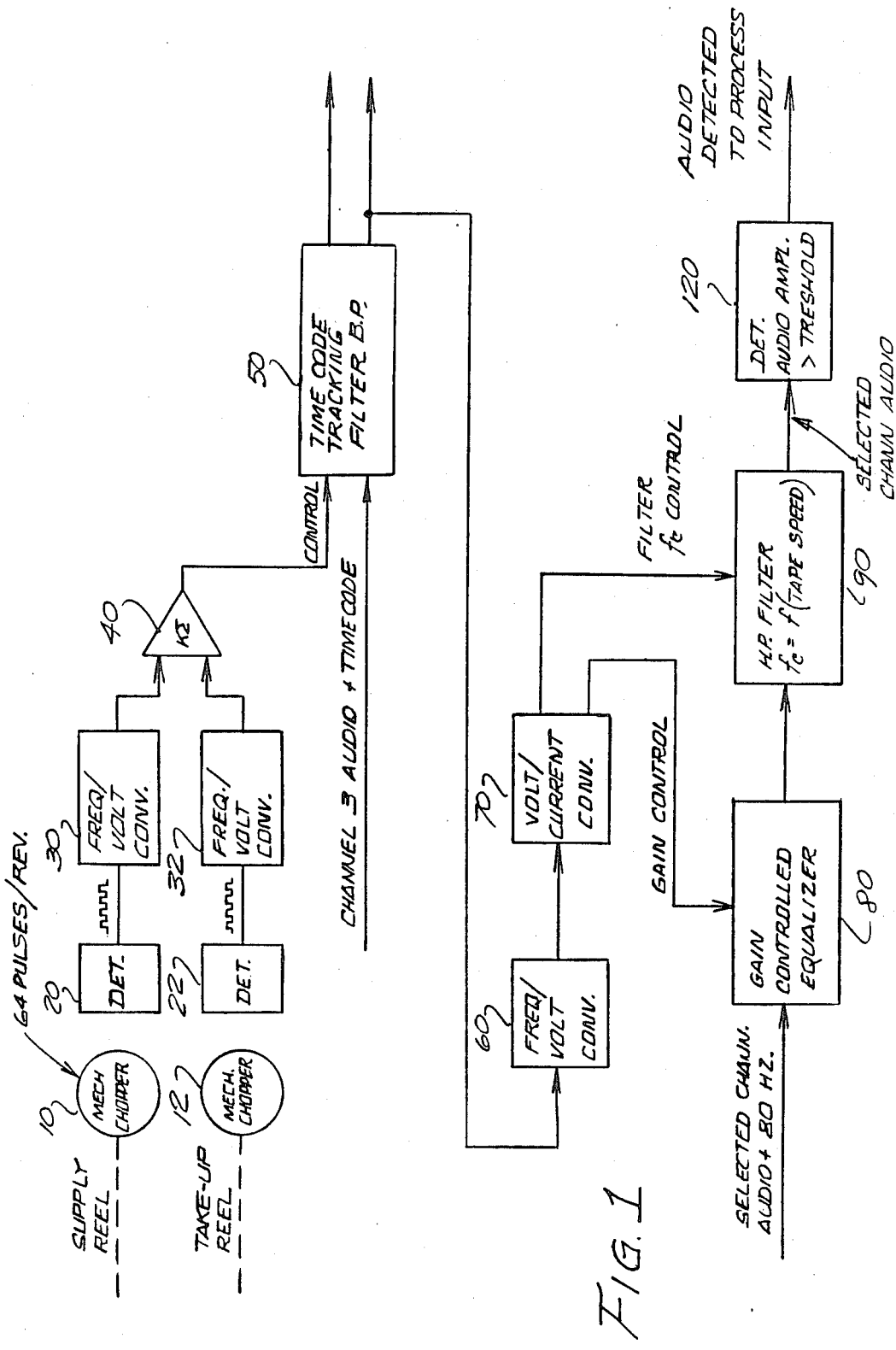
FIG. 1 is a block diagram of a portion of the scanning apparatus that is used with the present invention.

Referring now to the drawings, in particular to FIG. 1, there is illustrated a block diagram of scanning apparatus which is used with this invention and which carries out the scanning and rerecording operations, to be described.

In a typical tape recording system, tape is transported between a supply reel and a take-up reel. In a fast forward operation the take-up reel is driven at a constant angular rate so that as progressively more tape is wound onto the take-up reel, the speed at which the tape moves past the usual recording heads increases proportionately. In a reverse mode of operation, the situation is reversed.

In this invention, two mechanical choppers 10 and 12 are coupled to the supply and take-up reels of a reel-to-reel tape recorder (not shown in FIG. 1). In one embodiment the choppers are comprised of a thin metal disc with a multiplicity (e.g. 64) of small perforations around the circumference of the disc which are adapted to cooperate with detectors 20 and 22 to provide pulse information from which tape speed can be measured.

Detectors 20 and 22 are placed in immediate proximity to choppers 10 and 12. In this particular embodiment they are located directly below the perforated edges of choppers 10 and 12. The detectors, which in this embodiment are comprised of small photoelectric cells, receive light through the perforations in choppers 10 and 12. As choppers 10 and 12 rotate, light either reaches or is blocked from the photoelectric cells. Each time the light is blocked, detectors 20 and 22 turn off. In this way, the outputs of the detectors form square waves which, after further processing in frequency/voltage converters 30 and 32 and summer 40, provide a tape speed indication.

Frequency to voltage converters 30 and 32 are coupled to detectors 20 and 22 and are adapted to convert a square wave signal to a voltage signal proportional to the frequency of that square wave. This voltage signal, after further arithmetical operations in a summer 40, provides a control signal to a time code tracking filter 50.

Summer 40 is coupled to frequency to voltage converters 20 and 22 and is adapted to sum the voltage signals from converters 20 and 22, multiply the sum by a constant and provide the resultant control voltage to the time code tracking filter 50.

The time code tracking filter is coupled to summer 40 and is adapted to provide a clock signal to a frequency/voltage converter 60. This clock signal will vary from 80 Hz to 8000 Hz, depending upon the speed of the tape. The filter is also adapted to filter out a time code signal recovered from the tape. The time code tracking filter has been commercially available since at least February of 1982, and is found in a Model 5000 Logger and a Model 5500 Time Reader/Generator, both manufactured by Dictaphone Corporation, the assignee of the present invention. Because the particular circuit which performs these functions is known to those of ordinary skill in the art, no detailed description is provided herein.

Frequency/voltage converter 60 is coupled to time code tracking filter 50 and is adapted to convert the frequency of the signal received from time code tracking filter 60 to a voltage signal. As a numerical example, for each kilohertz of signal frequency, a 0.625 V.D.C. signal is generated. Frequency/voltage converter 60 operates in a manner known to those of ordinary skill in the art.

Voltage controlled current sources 70, 72 and 74 (FIG. 2) are each coupled to frequency/voltage converter 60 and are each adapted to provide a current which varies with the voltage level received from the frequency/voltage converter. As a numerical example, voltage controlled current source 70 provides a current equal to $1.96 \times 10^{-4} V_c$; and voltage controlled current sources 72 and 74 each provide a current equal to $4.02 \times 10^{-4} V_c$ (where $V_c$ is the voltage received from frequency/voltage converter 60). The voltage controlled current sources operate in a manner known to those of ordinary skill in the art.

A gain controlled equalizer 80 is coupled to voltage controlled current source 70 and is adapted to adjust the audio signal it receives from selected channel(s) reproduced from the tape of the logger. The current from voltage controlled current source 70 is used as the control signal to adjust the audio signal accordingly. As the tape speed increases from playback to 100 times playback speed, the audio signals reproduced from the tape increase in amplitude. Also, certain effects associated with the tape recording process affect certain frequencies more than others. Both the increase in signal amplitude and these frequency effects are corrected by equalizer 80. Gain controlled equalizers operate in a manner known to those of ordinary skill in the art.

Figure 2:
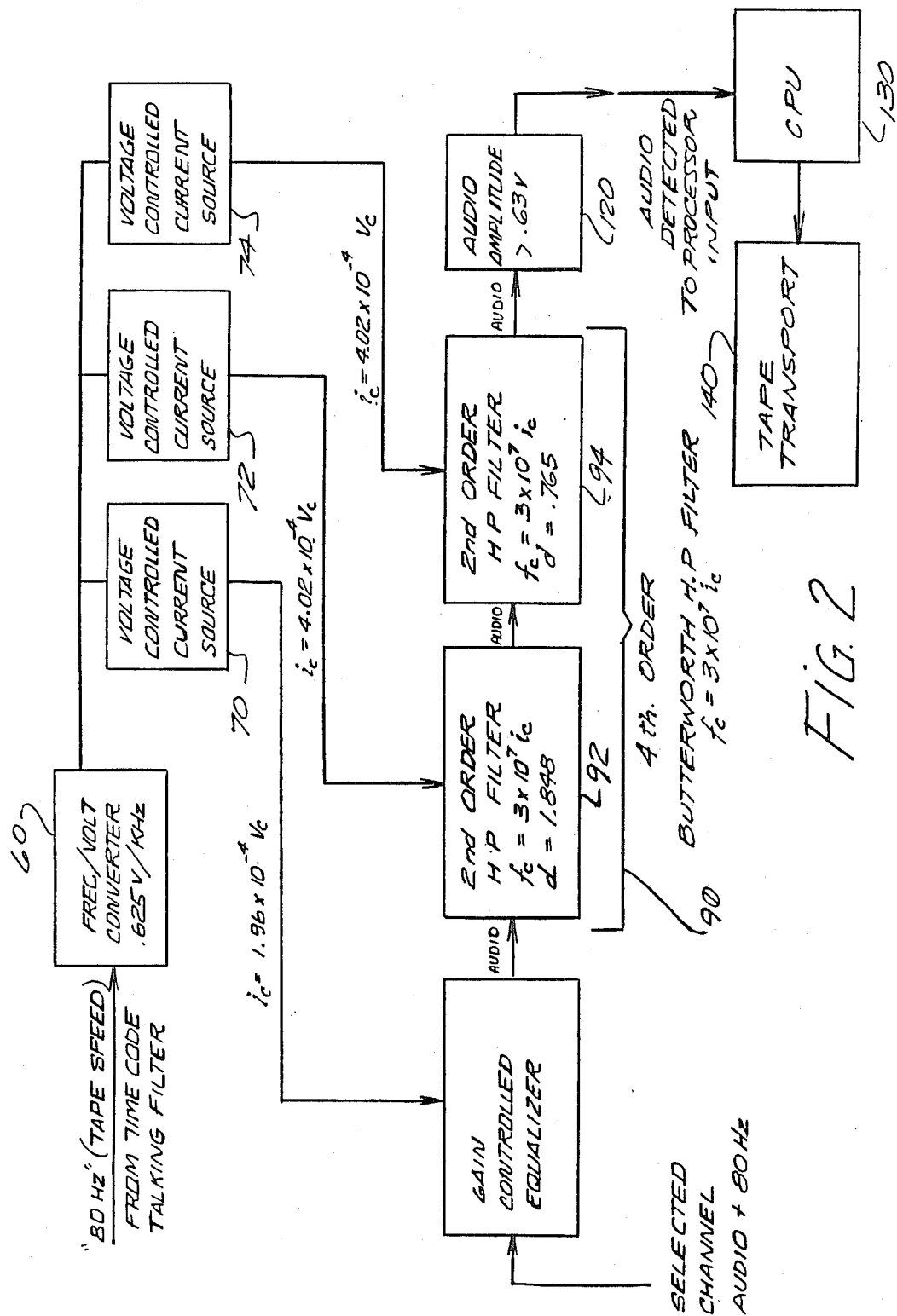
FIG. 2 is a block diagram of an adjustable filter that is used with this invention.

A high pass filter 90 is coupled to the gain controlled equalizer. As shown in FIG. 2, this filter is comprised of two second order high pass filters 92 and 94 coupled to voltage controlled current sources 72 and 74 and connected in series with each other to form a fourth order Butterworth filter. This fourth order Butterworth filter is adapted to receive the equalized audio signal from one or more audio channels on the tape and filter out low frequency signals. As a numerical example, the cut off frequency of filter 90 is equal to $3 \times 10^7 i_c$, where $i_c$ is the current, in amps, provided by sources 72 and 74. Consequently, the cut off frequency is not fixed, but shifts according to the magnitude of the current from sources 72 and 74. A Butterworth filter was chosen because of its maximally flat response in the frequency band of interest.

An audio amplitude detector 120 is coupled to fourth order Butterworth high pass filter 90 and is adapted to provide an output (e.g. +5 v.D.C.) signal when any audio signal it receives from Butterworth filter 90 exceeds a threshold voltage (such as 0.63 v). Detector 120 operates in a manner known to those of ordinary skill in the art.

Referring to FIG. 2, a central processing unit 130 is coupled to audio amplitude detector 120, as well as to other circuits not described herein. The central processing unit is adapted to direct various functions of the logging system, depending upon various signals, such as those received from audio amplitude detector 120 and from a keyboard (not shown). The operation of central processing unit 130 as it relates to the present invention is described below. As illustrated, tape transport mechanisms 140 are controlled by central processing unit 130 for moving the recording tape in a forward or reverse direction.

In operation, a user may select one of several audio search tape scanning routines. For convenience, a forward audio search is described.

As the search begins, the tape reels (supply and take-up reels) accelerate from rest or normal play, depending on the mode tape transport mechanism 140 was previously in, to anywhere between 50 to 100 times the normal forward tape speed. As mentioned above, as the diameter of the tape wound on the take-up reel increases, the linear speed of the tape likewise increases.

Mechanical choppers 10 and 12, with photoelectric detectors 20 and 22, frequency/voltage converters 30 and 32, and summer 40 provide an approximate tape speed measure to the time code tracking filter in the following manner. As choppers 10 and 12 rotate, detectors 20 and 22 generate pulse signals having repetition rates, or frequencies, determined by the rotary speed of the supply and take-up reels. These pulses are converted to voltage levels by frequency/voltage converters 30 and 32. As the frequency of pulses increases, the converted voltage levels increase. Summing the resultant voltages by summer 40 produces an approximate, instantaneous tape speed measurement.

Time code tracking filter 50 responds to the speed measurement voltage generated from summer 40 to determine its high frequency cut off and to generate what is referred to herein as an "80 Hz" tape speed signal. This signal is a square wave with a frequency related to the instantaneous tape speed. The tape speed signal ranges in frequency from 80 Hz to 8 KHz, and is recovered by time code tracking filter 50 from the time code reproduced from the tape.

The frequency of this tape speed signal is converted to a voltage signal by frequency/voltage converter 60; and this voltage signal is used as the control signal for voltage controlled current sources 70, 72, 74. These current sources provide currents which vary with the control voltages applied thereto.

The current generated by source 70 is used as a control signal for gain controlled equalizer 80. The equalizer receives the audio signal from the tape channel (or channels) being monitored. Because the amplitude of the audio signal increases as tape speed increases, the equalizer operates to reduce overall signal amplitude by a corresponding amount determined by the current received from source 70.

After being properly equalized by equalizer 80, the audio signal from the monitored tape channel (or channels) is filtered by high pass filter 90. As shown in FIG. 2, second order high pass filters 92 and 94 which comprise high pass filter 90 have cut-off frequencies determined by the current signals received from sources 72 and 74. Depending on the control currents supplied by sources 72 and 74, the minimum audio signal frequency to pass through the filter varies from, for example, 200 to 20 kHz.

After being filtered by high pass filter 90, the audio signal is continuously sampled by audio amplitude detector 120. If the audio signal voltage exceeds a pre-set threshold level, the detector applies an output signal to central processing unit 130 indicative of the presence of audio signal information in the channel(s) being scanned. The central processing unit, depending on the search mode that has been selected, commands the tape transport mechanism to perform a set of instructions now described.

Software Operating Routines

The detection of audio signals by the circuitry described above is used, for illustration, in three software subroutines—forward audio search, reverse audio search and rerecord.

Although not necessary for an understanding of the present invention, a brief overview of the system software will be useful. The main system program consists of an outer "loop" of statements, each statement of which calls a subroutine or subprogram. As an example, every statement in the outer loop is called once every 1/16 of a second. Three of the subroutines called by the outer loop involve a search for audio content on a channel or channels of the tape; and these are the aforementioned forward, reverse, and rerecord searches. For the sake of clarity, the flow charts shown in FIGS. 3, 4 and 5 use the same reference numeral, 500, for each statement which calls for a return to the outer loop program. Also, all exits to the outer loop program use the reference numeral 510.

Figure 3B:
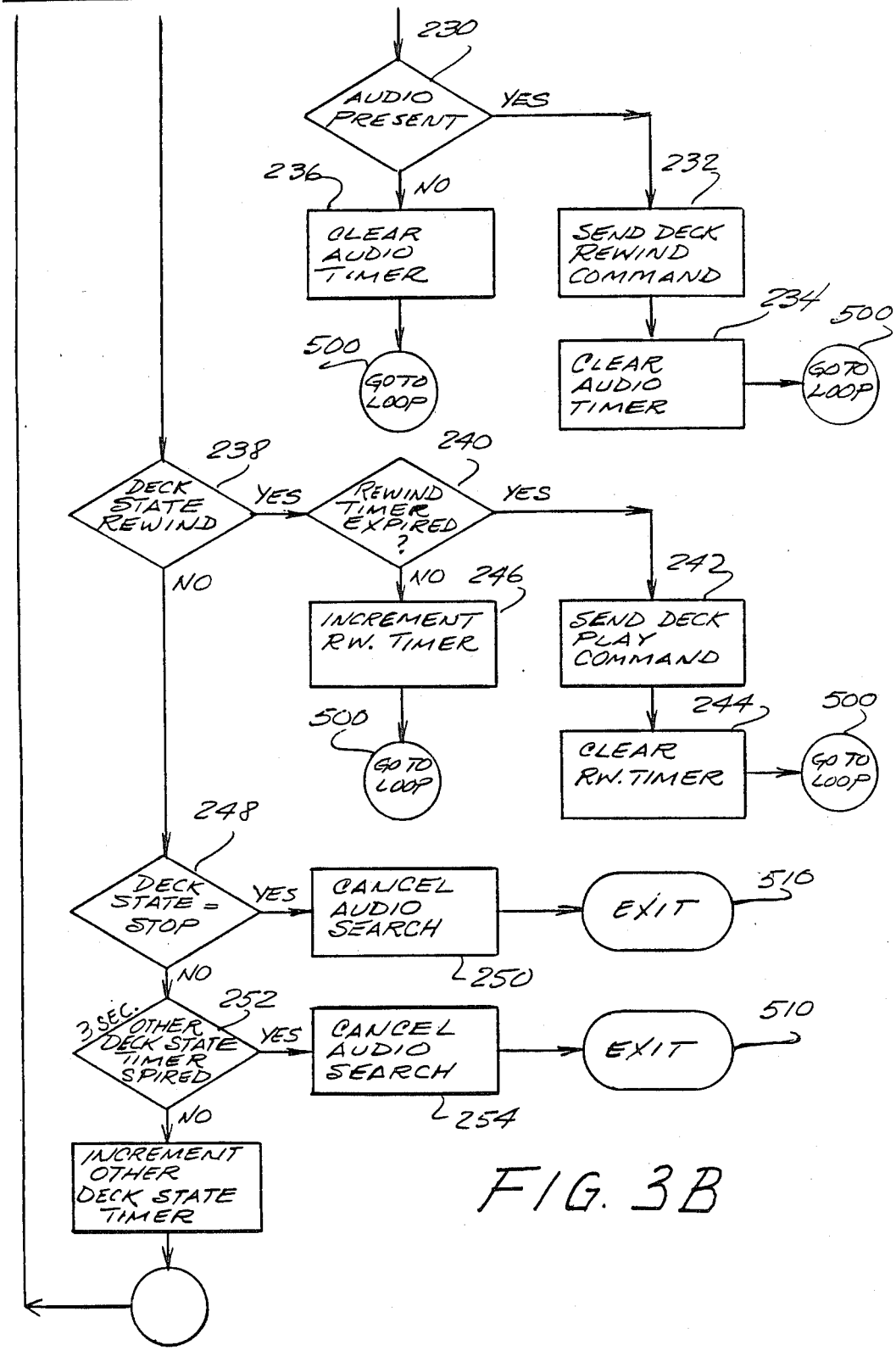
FIG. 3, consisting of FIGS. 3A and 3B, is a flow chart of a fast forward audio scan routine that is carried out in accordance with the present invention.

Forward Audio Search—FIG. 3

The principal of operation of the forward audio search is to advance the tape at a high rate of speed until audio content is detected on any one or more selected channels. Once audio is detected, the tape is automatically rewound to return to the approximate start of that audio message. This return is necessary because a finite amount of time is required to detect the presence of audio signals and control tape motion.

Referring now to FIG. 3, if a forward audio search is requested by an operator, this routine is entered at inquiry 200. The initial inquiry 200 is whether or not the tape recording unit is in a "play" mode. If it is, inquiry 202 determines if audio content has been detected. If the answer to 202 is also affirmative, an audio timer, which measures the elapsed time since audio first was detected, is reset to zero in step 204 and the program returns to the outer loop 500. If the answer to inquiry 202 is negative, the next inquiry 206 asks whether the audio timer has expired. As an example, the timer may time out after 15 seconds. If the timer has expired, indicating that no audio signal has been detected in the previous fifteen seconds, a command 208 is sent to the tape transport mechanism to operate in the fast forward mode, the audio timer is reset to zero, and the program returns to the outer loop 500. If the answer to inquiry 206 is negative, the timer is incremented at 212 and the program again returns to the outer loop 500. The purpose of steps 200 through 212 is thus to determine if a forward search is proper. Only if the last fifteen seconds of the tape have been silent will the tape recording device be changed over to a fast forward search from the play mode. One option, designated message skipping, is provided to circumvent these steps, and now will be described.

If the tape recording device is not in its play mode, inquiry 200 is answered in the negative and inquiry 214 inquires whether the present state of the device is fast forward. If the answer is affirmative, inquiry 216 is reached, which asks if the skip message feature has been requested. The skip message feature may be selected by the user to skip over the current audio content/message and move to the next one. Here, if the feature has been selected, inquiry 218 asks whether or not an audio signal is present. If it is, the audio timer is reset to zero at 220 and the routine returns to the outer loop 500. If no audio signal is present, the audio timer is checked at 222. If it has expired, a skip message flag is set to false, as at 224, the audio timer is cleared at 226, and the routine returns to the outer loop 500. If the timer has not expired, it is incremented at 228, and the outer loop is returned to 500.

Returning now to inquiry 216, if the skip message feature had not been selected, the next inquiry is whether an audio signal is present, as at inquiry 230. If an audio signal is present, the tape transport mechanism receives a rewind/chopper command 232, the audio timer is cleared at 234 and the outer loop is returned to 500. If no audio signal is present, the audio timer is cleared at 236 and the outer loop is returned to 500.

In summary, if the recording device is in its fast forward mode and no audio signal is detected, the search continues. If a skip message request is made and an audio signal is detected, the fast forward mode continues. If the skip message request is made, no audio signal is detected and the audio timer has expired, the skip message flag is changed to false (to prevent skipping over the next message encountered), the audio timer is cleared and the search continues. In this same case, if the timer had not expired it would have been incremented and the search continued. Finally, if audio is detected without a skip message request, the tape is rewound a predetermined amount positioning the play head at the beginning of the message, the audio timer is cleared and the main program is returned to. The amount of tape movement during the rewind command is measured by counting the number of chopper pulses generated by either the supply or take-up reel motion. As an example, the chopper pulses are generated by optically sensing the reel movement. In one embodiment, a total of 64 pulses are generated for each 360° rotation of a reel.

When a rewind/chopper command is received from the system controller, a rewind command is issued to the reel servo and the number of chopper pulses which occur from the time the rewind command is given until the reel motion changes from forward rotation to rewind rotation are counted. The servo continues to rewind until the number of additional chopper pulses is equal to the number of chopper pulses it took to reverse direction plus an additional amount of chopper pulses which is a function of the reel speed at the time the rewind/chopper command was received. These additional chopper pulses account for the reel movement during the time delay between audio detection by the system controller and the reception of the rewind/chopper command. By rewinding an amount of tape equal to the amount of tape movement to stop and change direction plus the amount of tape movement during the time delay between audio detection and the rewind command, the tape is returned to the position where audio was first detected.

If inquiry 214 is answered in the negative, the next inquiry 238 asks if the recording device is in its rewind mode. If it is, a rewind chopper counter is checked by inquiry 240. If the counter has expired, a play command is transmitted to the tape transport mechanism of the recording device, and the routine returns to outer loop 500. If the timer has not expired the outer loop is returned to at 500. The overall purpose of these steps 238–242 is to rewind the tape to the beginning of the message detected during the fast forward operation.

Inquiry 248 is reached if the answer to inquiry 238 is negative. If the deck is stopped, the audio search is cancelled at 250, and the program returns to the outer loop by an exit command 510. "Exit" differs from "return" in that a flag is set when the routine exits to the outer loop which prevents the fast forward audio search routine from being called again until the flag is changed, such as when the search mode is requested by the user. If the tape transport mechanism has not been stopped, inquiry 252 asks if the timer for other deck states, such as the Record Ready mode, has expired. If it has, the audio search is cancelled by instruction 254 and the routine exits to the outer loop. As an example, the other deck state timer has a 3 second delay. Finally, if the other deck state timer has not expired, it is incremented at 256, and the routine returns to outer loop 500. The purpose of steps 248–256 is to avoid inconsistent operation of the system. If the transport mechanism is in a stop mode, there is no reason to request a forward audio search, and a flag is set in the exit step which prevents returning to the forward audio search routine.

Figure 4A:
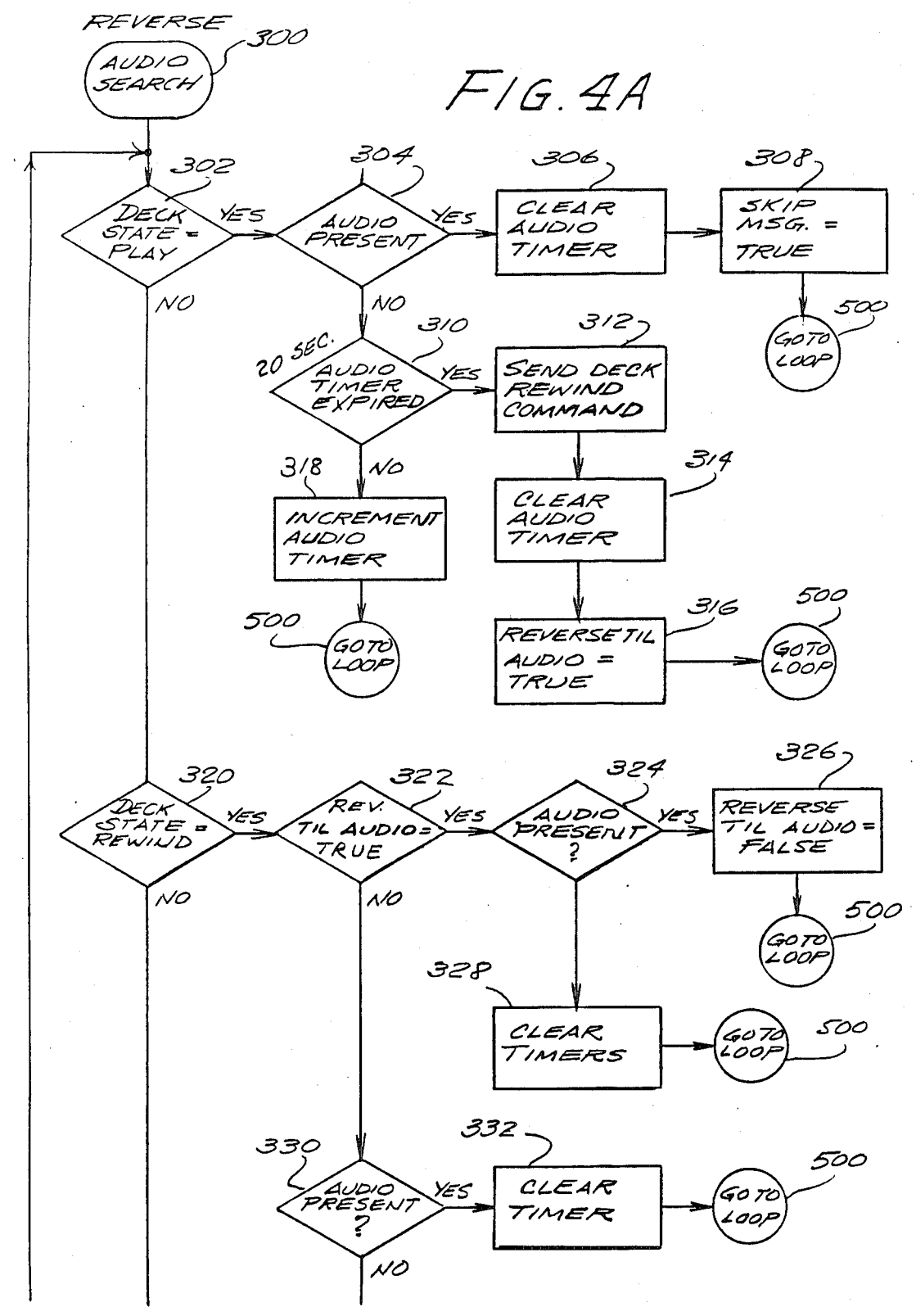
FIG. 4, consisting of FIGS. 4A and 4B, is a flow chart of a fast reverse audio scan routine that is carried out in accordance with the present invention.
Figure 4B:
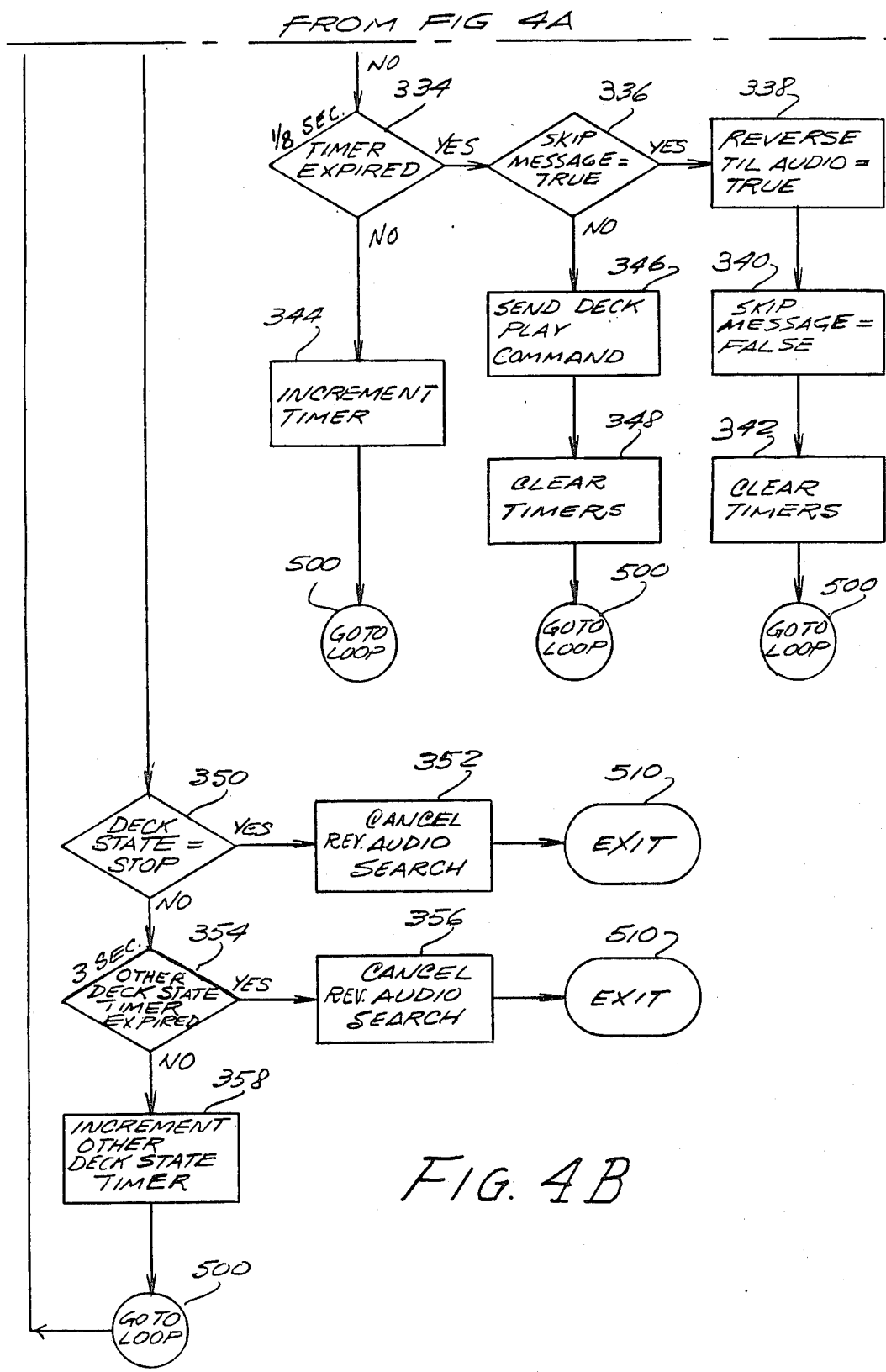

Reverse Audio Search—FIG. 4

The reverse audio search involves moving the tape rapidly in the reverse direction until an audio signal is detected. Once an audio signal is detected, the fast reverse operation is continued until silence is encountered for a set period of time. The tape is then advanced in the fast forward mode for a number of chopper pulses equal to the number of chopper pulses produced during the time it took the reel to change direction from fast rewind to fast forward plus an additional number of chopper pulses proportional to the reel speed at the time that the fast forward/chopper command was received. By rewinding an amount equal to the tape movement during the time delay between detection and receipt of the command, plus the amount of tape movement to change direction, the tape is returned to its position at the time of the last detection of audio. At that point, the tape is played in a forward direction. A message skipping feature is available in the reverse audio search mode. If a message is encountered during a reverse audio search and the user does not wish to listen to it, he or she actuates a reverse audio search selector (not shown). The tape will automatically fast reverse through the remainder of the message, after which another reverse audio search will be performed.

Referring now to FIG. 4, when the reverse audio search routine 300 is entered, inquiry 302 determines whether or not the recording device is in the play state. If so, inquiry 304 asks if audio is present. An affirmative answer leads to clearing the audio timer 306, changing the skip message flag to true 308 and then returning to the outer loop 500. If no audio is detected, inquiry 310 is reached. Here, if the audio timer has expired (such as a 20 second timer), a rewind command 312 is issued, the audio timer is cleared at 314, and the rewind operation is initiated and the "reverse until audio" flag is made true (or set) at 316. The routine then returns to outer loop 500. If the timer has not expired (inquiry 310 is answered in the negative), it is incremented at 318 and the routine returns to the outer loop. To summarize, the detection of audio in the play state causes the recording device to switch to its message skip mode, on the assumption that if the user has requested a reverse search while the device is playing back, he obviously intended to skip that message. If no audio is detected while the machine is in play, a fast rewind is begun as soon as the audio timer expires.

If the recording device is not in its play mode, inquiry 320 is reached to determine if the device is in its reverse mode. If it is, inquiry 322 inquires if a reverse audio search has been requested. If so, the audio detector (FIGS. 1 and 2) is checked by inquiry 324. If an audio signal is detected, the tape transport mechanism continues to reverse until no audio is detected, the "reverse until audio" flag is made false (or reset), as represented by instruction 326. The routine then returns to the outer loop 500. When no audio is detected, the timers are cleared at 328 and the outer loop is returned to. If a reverse audio search was not requested, inquiry 322 is answered in the negative and a check is made at 330 for the presence of audio. If audio is present, the timers are cleared at 332 and the routine returns to the outer loop 500. If no audio signals are present, the routine advances to check if a ⅛ second (or other brief duration) timer has expired, at 334. If it has, inquiry 336 is reached to determine if the skip message flag is set. If it is set (true), a reverse command is applied to the tape transport mechanism and the "reverse until audio" flag is made true, as represented by instruction 338, and then the skip message flag is reset (changed to false) at 340 and the timers are cleared at 342. Then, the routine returns to loop 500. If inquiry 336 is answered in the negative, i.e. if the skip message flag was clear (false), a fast forward/chopper command is applied to the tape transport mechanism by instruction 346, the timers are cleared 348, and the outer loop returned to. Finally, if the ⅛ second timer had not expired, that is, if inquiry 334 is answered in the negative, the timer is incremented at 344, and the outer loop is returned to. To summarize, this set of instructions 320–348 insures that the tape is rewound through a message and then replayed. If the skip message feature is selected, the tape rewinds through the message which has already been detected and continues to and through the second message, at which point that message is played.

If inquiry 320 results in a negative response, inquiry 380 is reached to determine if the deck is in the fast forward state. If this inquiry 380 is answered in the affirmative, a check at 381 is made to determine if the fast forward chopper pulse counter has expired (i.e. it has counted to the proper count), indicating that the tape has been positioned to the beginning of the detected audio message. If inquiry 381 is answered in the affirmative, the deck is commanded to its play mode. If the inquiry is answered in the negative, the routine returns to the loop.

If inquiry 380 results in a negative response, inquiry 350 is reached to determine if the tape is stopped. If it is, the audio search is cancelled at 352 and the routine exits at 510. The exit command sets a flag which prevents the outer loop from calling this reverse audio search routine again until the flag is cleared. If the tape is not stopped, the routine advances to inquire at 354 if any other deck state timer has expired. If it has, the audio search is cancelled at 356, and the routine is exited at 510. Both inquiries 350 and 354 prevent contradictory tape drive commands (e.g., reverse and stop) from being generated. Finally, if another deck state timer has not expired, it is incremented at 358 and the routine returns to the loop.

RERECORD—FIG. 5

The rerecord routine allows a user to monitor one or more channels and automatically rerecord the audio content of each selected channel on a remote recording device. Although similar to the forward and reverse audio scans, rerecord "pads" the message it detects with longer periods of silence on both ends of the message so that no part of the message is lost. Also, the skip message feature is disabled.

Figure 5B:
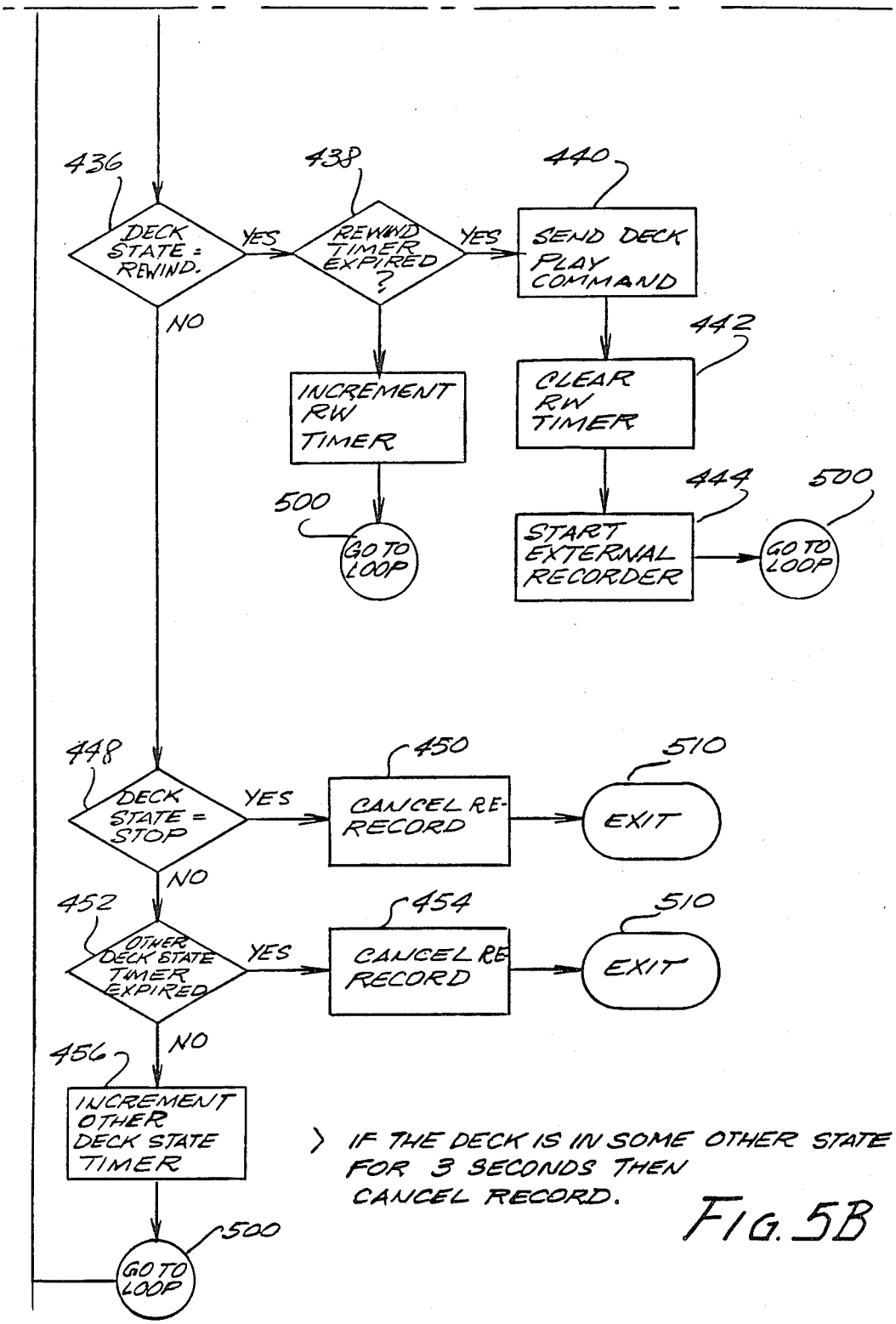
FIG. 5, consisting of FIGS. 5A and 5B, is a flow chart of a scan/rerecord routine that is carried out in accordance with the present invention.

As shown in FIG. 5, the rerecord program is entered at 400, the first inquiry 402 is whether the rerecord time is equal to the tape time. A user can set the rerecord routine to run for a desired length of time. Inquiry 402 checks if the routine has already run that length of time. If it has, the rerecord operation is cancelled at 404, a stop command is sent to the tape transport mechanism at 406, and an exit command 408 is produced to prevent reentry to the rerecord routine until it is requested once again.

If inquiry 402 is answered in the negative, the routine advances to inquiry 410 to ascertain if the transport mechanism is in a play mode. If it is, inquiry 412 determines if audio has been detected. If inquiry 412 is answered in the affirmative, the audio timers are cleared at 414 and the routine returns to the outer loop. If no audio has been detected, a check is made at 416 if an audio timer (such as a 20 second timer) has expired. If it has, a fast forward command is applied to the tape transport mechanism at 418, the audio timer is cleared at 420, the external recorder (on which audio information is rerecorded) is halted at 422, and the outer loop returned to. If the audio timer has not expired, it is incremented at 424, and the outer loop is returned to. Instructions 410–424 assure that each re-recorded message is followed by 20 seconds of silence before ending the rerecording operation and searching for a new message on the tape.

If inquiry 410 is answered negatively, the routine advances to inquire, at 426, if the transport mechanism is operating in its fast forward mode. If it is, the routine checks to determine if audio is present, as at 428. If inquiry 428 is answered in the affirmative, the tape transport mechanism is supplied with a rewind/chopper command 430, the audio timer is cleared at 432 and the outer loop is returned to at 500. However, if no audio signal is detected, the audio timer is cleared at 434 and the outer loop is returned to. Instructions 426–434 insure that re-recorded messages are preceded by a period of silence and that if no message is found for re-recording, the fast forward operation of the tape continues.

If the tape transport mechanism is not in its slow fast forward mode, the routine advances to inquiry 436 to sense if the transport mechanism is in its rewind mode. If it is, the routine asks at 438 if a rewind counter has expired. When the rewind counter has expired, a sufficient number of chopper pulses will have been counted to insure that the tape has been positioned just before the start of the detected audio message. The method of determining the number of chopper pulse counts is the same as was previously described for forward audio search.

If the rewind counter has expired, the tape transport mechanism is commanded to play, at 440, the external recorder is started, at 444, and the routine returns to the loop. If the rewind counter has not expired, inquiry 438 is answered in the negative and the outer loop is returned to at 500. Instruction 436–444 insure that a rerecorded message is preceded by silence.

If inquiry 436 is answered in the negative, inquiry 448 is reached to determine if the transport mechanism is in its stop mode. If it is, rerecord is cancelled at 450, and an exit is performed at 510. If the transport mechanism is not stopped, but another deck state timer (e.g. a 3 second timer) has expired, inquiry 452 is answered in the affirmative and the rerecord operation is cancelled, at 464. The program then exits at 510. If the other deck state timer has not expired, the other deck state timer is incremented at 456 and the routine returns to the outer loop, at 500. Instructions 448–456 insure that contradictory operating states are prevented.

While the present invention has been particularly shown and described with reference to a preferred embodiment, it will be appreciated that various changes and modifications may be made without departing from the spirit and scope of the invention. For example, this invention need not be limited solely to the environment of loggers. Also, the information for which the search operation or the rerecord operation is carried out need not be constrained to audio information. Other information, including digital signals, can be searched for and rerecorded. Still further, the circuitry shown in FIGS. 1 and 2 are intended to be merely illustrative. Other means of detecting and indicating tape speed (or speed of other recording media), generating speed-dependent control signals and compensating for increases in recovered signal frequency caused by increases in tape speed may be used. Filter 90 need not be limited to a fourth order Butterworth filter.

It is intended that the appended claims be construed to cover the foregoing and other equivalent changes, modifications and functional implementations.

What is claimed is:

1. In a signal recording/playback system including means for recording on, signal information and for playing signal information back from, a movable record medium, said signal information including a tone having a sub-audio frequency at playback speed for said record medium, apparatus for monitoring said movable record medium for providing an indication of the presence of signal information thereon, comprising:
   variable frequency filtering means having a variable low frequency cut-off and coupled to receive signal informatiion output from said record medium at various said speeds and for providing a high-pass filtered output:
   control circuit means for varying the low frequency cut-off of said variable frequency filtering means in proportion to the output frequency of said tone so that the portion of said signal information which is sub-audio at said playback speed is filtered as the speed of said record medium varies; and
   monitoring means for monitoring said output of said variable frequency filtering means to detect residual signal information.

2. The apparatus of claim 1 wherein said variable frequency filtering means comprises a fourth order Butterworth filter having a variable cut-off frequency.

3. The apparatus of claim 2 wherein said fourth order Butterworth filter is comprised of two second order high pass filters connected in series and both having variable cut-off frequencies.

4. The apparatus of claim 1 wherein said control circuit means includes means coupled to the variable frequency filtering means and responsive to changes in the speed of said movable record medium for producing a control current which changes in magnitude with increase in the speed of said movable record medium.

5. The apparatus of claim 4 wherein said variable frequency filtering means comprises a high pass filter having a variable cut-off frequency, and means for applying said control current to said high pass filter to vary said cut-off frequency in proportion to the magnitude of said control current.

6. The apparatus of claim 5 wherein said high pass filter is comprised of two series connected second order high pass filters both having variable cut-off frequencies that vary in direct proportion with increases in magnitude of said control current.

7. The apparatus of claim 4 wherein said control circuit means includes photoelectric or magnetic detecting means for detecting the speed of said movable record medium.

8. The apparatus of claim 4 wherein said record medium comprises a magnetic tape; said recording/playback system includes supply and take-up reels between which the magnetic tape is transported; and said control circuit means includes means coupled to said supply and take-up reels for generating first and second sets of pulse signals having respective repetition rates determined by the rotary speeds of said supply and take-up reels, frequency-to-voltage converting means responsive to said first and second sets of pulse signals for producing first and second voltage levels as a function of the respective repetition rates, means for combining said first and second voltage levels to produce a control voltage representative of the speed of movement of said magnetic tape, and voltage-controlled current generating means responsive to said control voltage to generate said control current.

9. The apparatus of claim 1 wherein said monitoring means comprises an audio amplitude detector having a predetermined threshold detecting level for producing an indicating signal when the output from said variable frequency filtering means exceeds said predetermined threshold detecting level.

10. The apparatus of claim 1 wherein said control circuit means is comprised of a timecode tracking filter for producing a signal whose frequency varies with the speed of said movable record medium; frequency-to-voltage converting means coupled to said timecode tracking filter for converting the frequency of the produced signal to a voltage signal proportional to said speed of said record medium; and voltage-controlled current generating means coupled to said frequency-to-voltage converting means for generating currents in proportion to the magnitude of said voltage signal.

11. The apparatus of claim 1 further comprising gain-controlled equalizing means coupled to said variable frequency filtering means for equalizing the signal information played back from said movable record medium and applying equalized signal information to said variable frequency filtering means.

12. The apparatus of claim 1 wherein said signal recording/playback system is a multichannel audio information logging system.

13. The apparatus of claim 1 wherein said variable frequency filtering means has a lower cut off frequency of about 300 hz when said movable record medium moves at a recording/playback speed.

14. The apparatus of claim 13 wherein said variable frequency filtering means has a lower cut-off frequency of about 30 kHz when said movable record medium moves at a fast-forward or fast-rewind speed.

15. The apparatus of claim 14 wherein said variable frequency filtering means has a lower cut-off frequency in a range of from about 300 Hz to 30 kHz, said cut-off frequency being determined by the magnitude of a control signal from said control circuit means.

16. The apparatus of claim 1, further comprising an additional signal recording device coupled to receive signal information played back from said record medium and for recording said played back signal information.

17. A method of controlling a signal playback device wherein signal information is played back from a movable record medium, said method comprising the steps of moving said movable record medium rapidly in a forward direction; monitoring said movable record medium for the presence of residual signal information above a cut-off frequency proportional to the output frequency of a tone prerecorded thereon; stopping said movable record medium when said residual signal information is detected; moving said movable record medium in a reverse direction for a distance approximately equal to the distance required to stop said medium; and advancing said movable record medium at a playback speed to play back signal information therefrom.

18. A method of controlling a signal playback device wherein signal information is played back from a movable record medium; said method comprising the steps of moving said movable record medium at a relatively rapid rate in a reverse direction; monitoring said movable record medium for the presence of residual signal information above a cut-off frequency proportional to the output frequency of a tone prerecorded thereon; detecting the presence of said residual signal information; continuing to move said movable record medium rapidly in the reverse direction; detecting the absence of said residual signal information; halting the movable record medium when no residual signal information has been detected for a predetermined period of time; and advancing said movable record medium to the beginning of said detected residual signal information, and then playing back signal information from said medium at playback speed.

19. The method of claim 17 or 18 further comprising the step of recording the played back signal information on a remote signal recording device.

* * * * *